United States Patent [19]
Wehner et al.

[11] Patent Number: 6,141,099
[45] Date of Patent: Oct. 31, 2000

[54] COMPACT, VARIABLE LENGTH INTERFEROMETER DELAY STAGE

[75] Inventors: Michael J. Wehner, Hawthorne; Bruce David Marcus, West Los Angeles; James W. Wehner, Hawthorne, all of Calif.

[73] Assignee: TRW Inc., Redondo Beach, Calif.

[21] Appl. No.: 09/193,679

[22] Filed: Nov. 17, 1998

[51] Int. Cl.[7] .................................................. G01B 9/02
[52] U.S. Cl. .......................... 356/345; 356/356; 356/358
[58] Field of Search ................................. 356/345, 356, 356/358

[56] References Cited

U.S. PATENT DOCUMENTS 5,825,493  10/1998  McGlynn ................................. 356/346

Primary Examiner—Robert H. Kim
Assistant Examiner—Andrew H. Lee
Attorney, Agent, or Firm—Michael S. Yatsko; Connie M. Thousand

[57] ABSTRACT

A compact delay stage for phase delaying a light signal to provide increased amounts of phase delay to a light signal. A plurality of reflective structures are configured to provide a delay path to the light signal. One of the reflective structures is configured to accept the light signal and direct the light signal between the reflective structures a predetermined selectable number of times until the light signal has completed the delay path thereby translating the light signal into a delay signal. One of the reflective structures is configured to provide egress to the delayed signal to exit the compact delay stage.

29 Claims, 12 Drawing Sheets

COMPACT, VARIABLE LENGTH INTERFEROMETER DELAY STAGE

BACKGROUND OF THE INVENTION

The present invention relates generally to delay lines for delaying light signals, and more particularly to a compact delay line for matching phases between two light signals in an interferometer.

Referring to FIGS. 1 and 2, an interferometer 15 has many applications including determining the distance between two light sources (not shown) which radiate two separate light signals 16, 17. To do so, the interferometer 15 produces an interference fringe pattern 18 by equalizing the path length between the first 16 and second 17 light signals by phase delaying the first light signal 16 by an amount equal to the path length difference L between the first 16 and second 17 light signals. An interferometer 15 typically uses two separate collecting telescopes 19, 20 to collect the two light signals 16, 17 respectively. The collecting telescopes 19, 20 route the two light signals 16, 17 to a beam combiner and focal plane 21 where the interference fringe pattern 18 is formed. To equalize the pathlengths between the light signals 16, 17, a three stage delay line 22 is placed in one or both legs 23, 24 of the interferometer 15 and is configured to balance the pathlengths between the two light signals 16, 17. Fixed mirrors 25, 26 are used to provide ingress and egress for the first light signal 16 to enter the three stage delay line 22. The first stage 27 of the three stage delay line 22 is used for correcting path length errors in the meter to millimeter range and typically uses moveable mirrors 28, 30 to adjust the length of the delay path 32. To reduce or increase the delay path 32, the adjustable mirrors 28, 30 are moved closer to 33 or further from 34 the fixed mirrors 25, 26 respectively.

The second stage (not shown) of the three stage delay line 22 is used to correct path length errors in the millimeter to micron range and typically uses a voice coil to provide micron accuracy. The third stage (not shown) of the three stage delay line 22 is used for correcting path length errors in the micron and nanometer range and typically uses a piezoelectric material to provide nanometer accuracy.

The path length adjustment capability of the first stage 27 is limited by the physical travel capability of the adjustable mirrors 28, 30, since the absolute amount of phase error that can be corrected in the interferometer 15 is limited by the path length adjustment capability, or throw, of the first stage 27 of the three stage delay line 22. This can cause a problem for interferometers requiring large path delay capabilities such as interferometers with large angular fields of view and space-based free-flying interferometers.

For a space-based free-flying interferometer, the collectors 19, 20 of the interferometer 15 are located on separate spacecraft with the combiner 21 and the three stage delay line 22 being located on a third spacecraft. The phase error correction capability of the first stage 27 of the three stage delay line 22 mandates the accuracy within which the interferometer collectors 19, 20 must be controlled. This in turn constrains the formation flying accuracy in which the spacecraft must be controlled. For example, a free-flying interferometer 15 having a ten centimeter long throw 32 would constrain the spacecraft to flying in formation with errors of less than ten centimeters which is a potentially stressing requirement on the system. Increasing the path length 32 of the three stage delay line 22 can allow larger angular movement and ease the stringent formation accuracy requirement. However, this can be difficult in the typical three stage delay line 22 since increasing the path length of the first stage 27 of the typical three stage delay line 22 requires increasing the spacing between the mirrors 25, 26, 28, 30, requiring additional area on the spacecraft consuming spacecraft volume which may not be available and can be expensive.

What is needed therefore, is a delay line with the capability to provide increased delay to a light signal 16 and do so in a compact space.

SUMMARY OF THE INVENTION

The preceding and other limitations of the prior art are addressed and overcome by the present invention which provides a compact delay stage for phase delaying a light signal to provide increased amounts of phase delay to a light signal. The compact delay stage comprises a plurality of reflective structures which are configured to provide a delay path to the light signal. One of the reflective structures is configured to accept the light signal and direct the light signal between the reflective structures a predetermined selectable number of times until the light signal has completed the delay path translating the light signal into a delay signal. One of the reflective structures is configured to provide egress to the delayed signal to exit the compact delay stage.

In another aspect, the present invention provides an interferometer having increased phase delay capabilities. The interferometer comprises first and second collectors, a first compact delay stage and a beam combiner. The first and second collectors are configured to collect first and second light signals respectively. The first compact delay stage comprises a plurality of first reflective structures which are configured to provide a first delay path to the first light signal. One of the first reflective structures is configured to accept the first light signal and direct the first light signal between the first reflective structures a predetermined selectable number of times until the first light signal has completed the first delay path translating the first light signal into a first delay signal. One of the first reflective structures is configured to provide egress to the first delayed signal to exit the first compact delay stage. The beam combiner is configured to combine the first delayed signal and the second light signal.

In still another aspect, the present invention provides a high precision interferometer for delaying a first light signal a predetermined amount with respect to a second light signal and maintaining the polarization of the first final delayed light signal with respect to the second final delayed light signal. The interferometer comprises first and second collectors, first and second compact delay stages, first and second delay lines, and a beam combiner. The first and second collectors are configured to collect first and second light signals respectively.

The first compact delay stage is comprised of a plurality of first and reflective structures configured to direct the first light signal between the first and reflective structures a predetermined selectable number of times to translate the first light signal into a first intermediate delayed signal. The second compact delay stage is comprised of a plurality of second reflective structures configured to direct the second light signal between the second reflective structures a predetermined selectable number of times to translate the second light signal into a second intermediate delayed signal. The first and second reflective structures are equal in number and configured to reflect the first and second light signals the same number of times and at the same relative angles. The first compact delay stage is configured to provide a greater amount of phase delay to the first light signal than that provided to the second light signal by the second compact delay stage.

The first and second delay lines are comprised of third and fourth reflective structures respectively configured to provide a third and fourth delay path respectively to the first and second intermediate delayed signals respectively. The third and fourth reflective structures are equal in number and configured to reflect the first intermediate delayed signal the same number of times and at the same relative angles as the second intermediate delayed signal. The second delay line is configured to provide a greater amount of phase delay to the second intermediate delayed signal than that provided to the first intermediate delayed signal to provide first and second final delayed signals having the same relative phase and polarization.

BRIEF DESCRIPTION OF THE DRAWINGS

Reference is now made to the detailed description of the preferred embodiments illustrated in the accompanying drawings, in which.

DETAILED DESCRIPTION OF THE PREFERRED EMBODIMENTS

Figure 1:
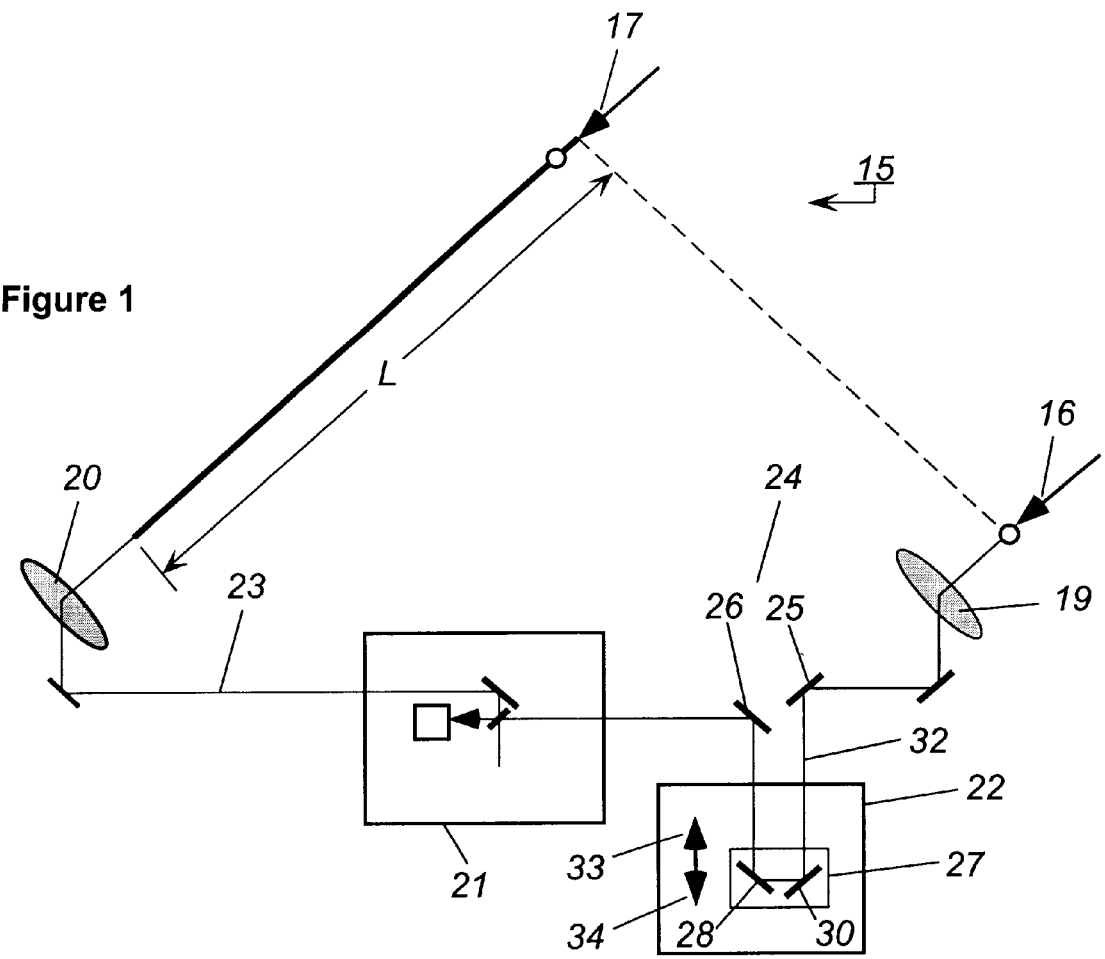
FIG. 1 is a schematic diagram of a typical prior art interferometer having a three stage delay line.
Figure 2:
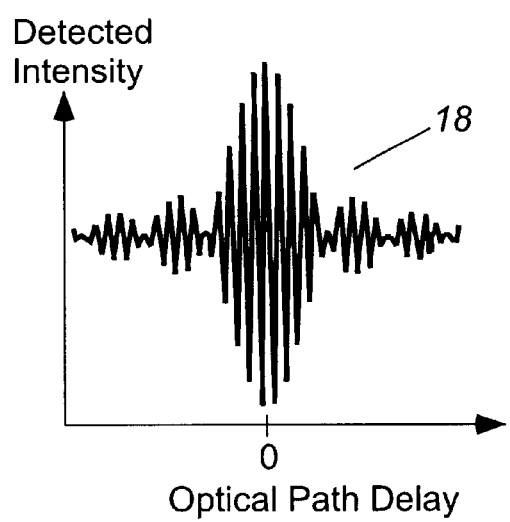
FIG. 2 is a graph showing a typical interference pattern generated by the interferometer of FIG. 1.
Figure 3:
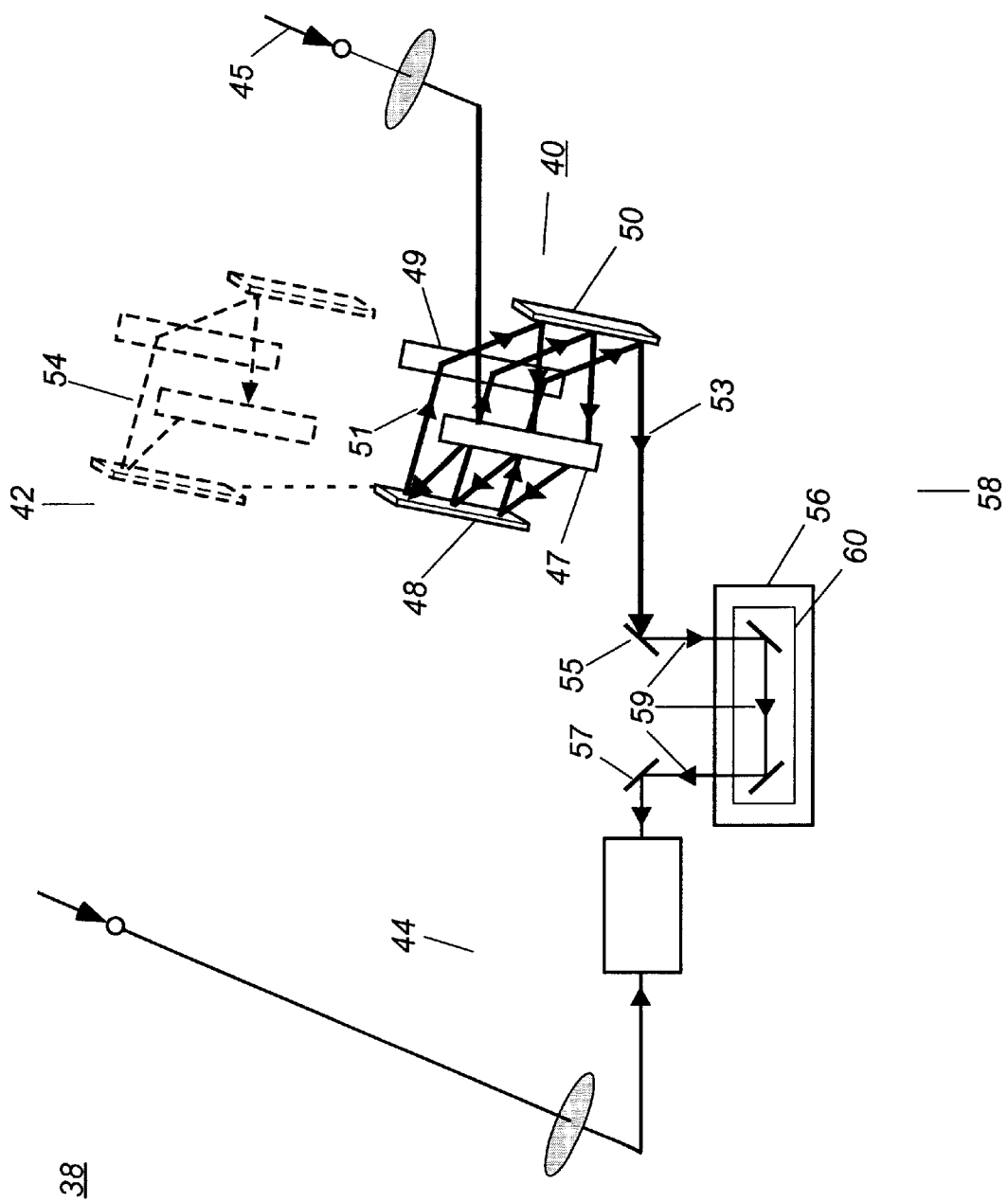
FIG. 3 is a schematic diagram of an interferometer having a compact delay stage in accordance with a first embodiment of the present invention.

Referring to FIG. 3, the present invention provides additional path delay capabilities to an interferometer 38. To do so, a compact delay stage 40 is added to one or both legs 42, 44 of the interferometer 38. The compact delay stage 40 provides increased amounts of phase delay to a light signal 45 and has the capability to delay a light signal 45 in the millimeter, tens of meters and above range. The light signal 45 can be a radio frequency (RF), Infra-red (IR), Visible or Ultra Violet (UV) signal. The light signal 45 can also be any photon capable of being reflected. For the preferred embodiment of the invention, the compact delay stage 40 is comprised of a plurality of reflective structures 47–50, preferably mirrors 47–50, which are configured to provide a delay path 51 to the light signal 45. One of the mirrors 47 is configured to accept the light signal 45 and direct the light signal 45 between the mirrors 47–50 a predetermined selectable number of times until the light signal 45 has completed the delay path 51 translating the light signal 45 into a delayed signal 53. One of the mirrors 47 is configured to provide egress to the delayed signal 53 to exit the compact delay stage 40. To do so, one of the mirrors 47 is positioned so that the delayed signal 53 misses the mirror 47 after completing the desired delay path 51. For the example shown in FIG. 3, the first mirror 47 is configured such that the delayed signal 53 misses the first mirror 47 after the light signal 45 has been directed between the mirrors 47–50 and around the loop 54 three times. The first mirror 47 can be a flip mirror or any other mirror known in the art which is positional to a preselected location.

For a first embodiment of the invention, the compact delay stage 40 is coupled with an input mirror 55, a three stage delay line 56, and an output mirror 57 to provide a compact delay line 58. The compact delay line 58 is disposed in one or both legs 42, 44 of an interferometer 38. Preferably, the mirrors 47–50 are configured so that reflecting the light signal 45 between the mirrors 47–50 and around the loop 54 one time provides a phase delay to the light signal 45 which is approximately equal to the maximum path delay 59 available from the first stage 60 of the three stage delay line 56. By configuring the compact delay stage 40 in this manner, each time the amount of phase delay required exceeds the delay capability 59 of the first stage 60 of the three stage delay line 56, the light signal 45 is directed one additional time around the loop 54 (and the first stage 60 of the three stage delay line 56 is adjusted accordingly). For example, if the maximum delay capability of the first stage 60 of the three stage delay line 56 is ten centimeters, the compact delay stage 40 would be configured such that one loop 54 is approximately ten centimeters. Then, a light signal 45 requiring a phase delay of 0–10 cm would be directed to bypass the compact delay stage 40 and enter the three stage delay line 56 directly via the input mirror 54; a light signal 45 requiring a phase delay greater than ten centimeters but less than twenty centimeters would be routed over the loop 54 one time prior to being directed into the three stage delay line 56. A light signal 45 requiring a phase delay greater than twenty centimeters but less than thirty centimeters would be routed over the loop 54 two times prior to being directed into the three stage delay line 56; and so forth. The mirrors 47–50 of the compact delay stage 40 can be planar mirrors, tilt mirrors, or the like positioned at a variety of angles with respect to one another such that many configurations of the compact delay stage 40 are possible.

Figure 4:
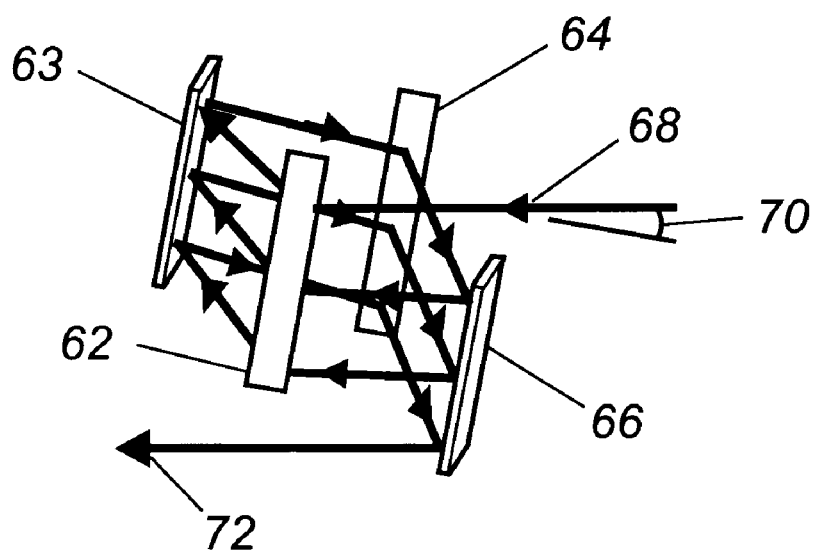
FIGS. 4–10 are schematic diagrams of compact delay stages in accordance with second through eighth embodiments of the invention.

Referring to FIG. 4, for a second embodiment of the invention, the compact delay stage 61 is comprised of a plurality of planar mirrors 62–66 positioned parallel to each other and configured to direct the light signal 68 in a spiral pattern. The first mirror 62 is configured so that the light signal 68 is incident on the first mirror 62 at an angle 70 and is reflected from the first mirror 62 at the same angle 70. The mirrors 62–66 are each configured so that the light signal 68 is incident on and reflected by each of the mirrors 62–66 at the angle 70 thereby directing the light signal 68 in a spiral pattern. The light signal 68 can be directed between the mirrors 62–66 as many times as required to delay the light signal 68 a preselected amount. After the light signal 68 has been delayed the preselected amount, one of the mirrors 60 is positioned to provide egress to the delayed light signal 72 to exit the compact delay stage 61.

Figure 5:
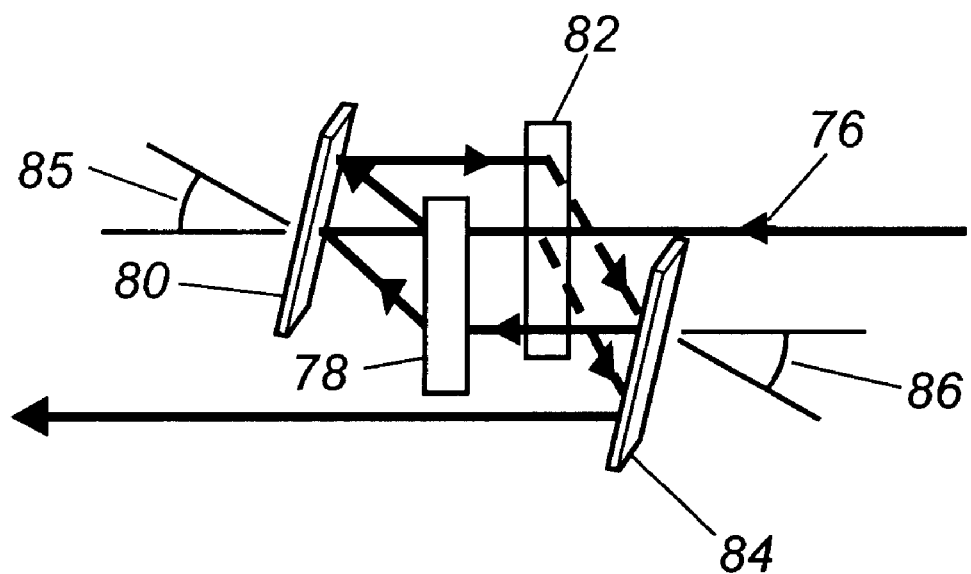

Referring to FIG. 5, for a third embodiment of the invention, the light signal 76 is directed in a spiral pattern by positioning two of the mirrors 80, 84 at first and second angles 85, 86 with respect to the other mirrors 78, 82. The mirrors 78–84 are positioned so that light signal 76 is incident on the first mirror 78 at a ninety degree angle. The first mirror 78 reflects the light signal 76 at a 90 degree angle and directs the light signal 76 towards the second mirror 80. The second mirror 80 is cantilevered at a first angle 85 such that the light signal 76 is incident on the second mirror 80 at the first angle 85 with respect to the second mirror 80. The light signal 76 is reflected by the second mirror 80 at the first angle 85 and directed towards the third mirror 82 at that first angle 85. The light signal 76 is incident on and reflected by the third mirror 82 at an angle equal to the first angle 85. The fourth mirror 84 is cantilevered in the opposite direction as the second mirror 80 at a second angle 86 which is equal to the first angle 85. The light signal 78 is incident on the fourth mirror 84 and is reflected by the fourth mirror 84 so that the light signal 76 is reflected towards the first mirror 78 at a ninety degree angle with respect to the first mirror 78.

Figure 6:
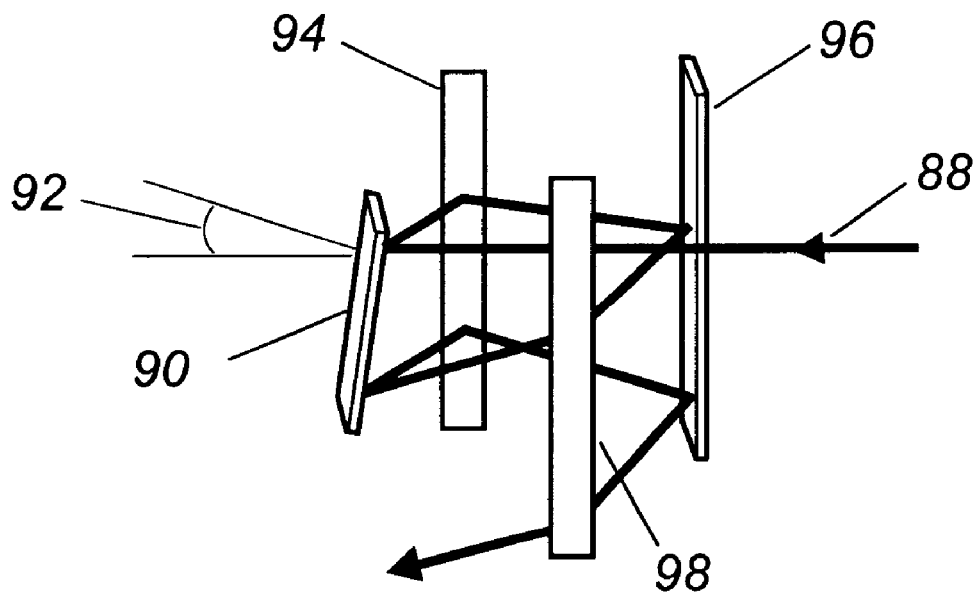

Referring to FIG. 6, for a fourth embodiment of the invention, the light signal 88 is directed in a progressive spiral pattern by cantilevering one of the mirrors 90 at an angle 92 with respect to the other mirrors 94, 96, 98. The mirrors 90, 94, 96, 98 are positioned so that light signal 88 is incident on the first mirror 90 at a ninety degree angle with respect to the other mirrors 94–98. The light signal 88 is incident on the first mirror 90 and reflected from the first mirror 90 at an angle 92. The light signal 88 is directed towards and reflected from the second 94, third 96 and fourth 98 mirrors at the angle 92. Since the first mirror 94 is cantilevered at an angle 92, each time the light signal 88 is incident on the first mirror 90, the angle at which the light signal 88 is reflected from the first mirror 92 is increased by an additional amount equal to the angle 92. Thus, the angle at which the light signal 88 is incident on and reflected by the mirrors 90, 94, 96, 98 becomes progressively larger with each additional time the light signal 88 is directed between the mirrors 90, 94, 96, 98. In this manner, the light signal 88 is directed in progressive spiral manner.

Figure 7:
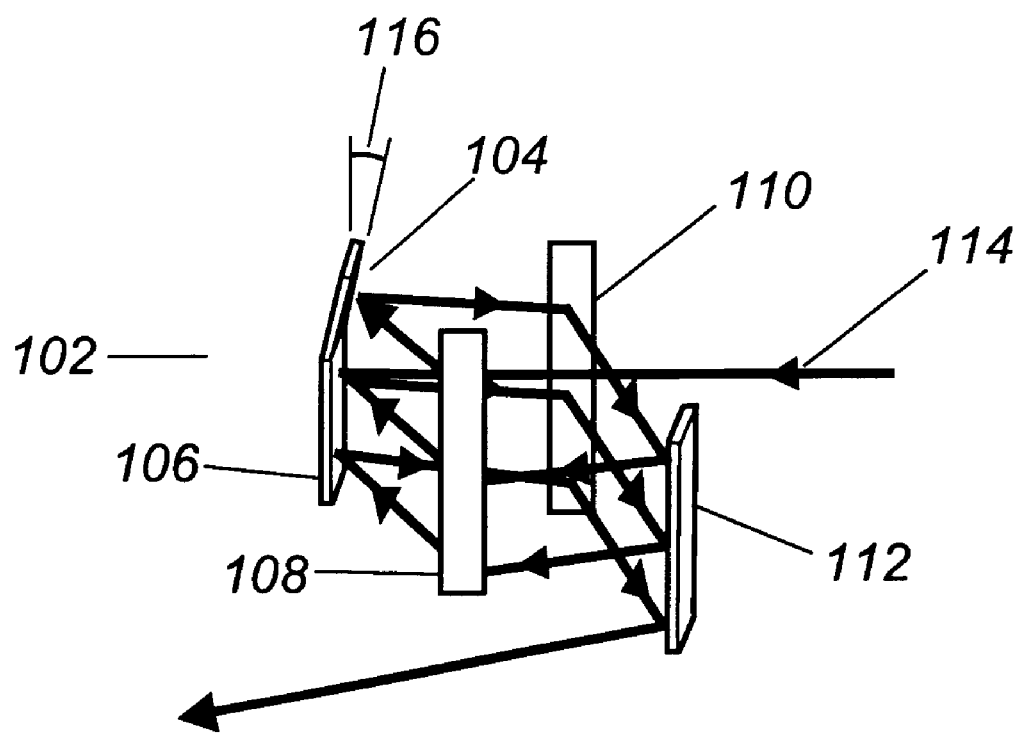

Referring to FIG. 7, for a fifth embodiment of the invention, one of the mirrors 102 is a tilt mirror 102 which is comprised of a tilted portion 104 and a straight portion 106. The other mirrors 108, 110, 112 are planar mirrors configured to be parallel with each other and also parallel to the straight portion 106 of the tilt mirror 102. The light signal 114 is incident on the tilt portion 104 of the tilt mirror 102 which reflects the light signal 114 at the tilt angle 116. The light signal 114 is then incident on each of the planar mirrors 110, 112, 108 and the planar portion 106 of the tilt mirror 102 at this angle 116 thereby directing the light signal 114 in a spiral pattern.

Figure 8:
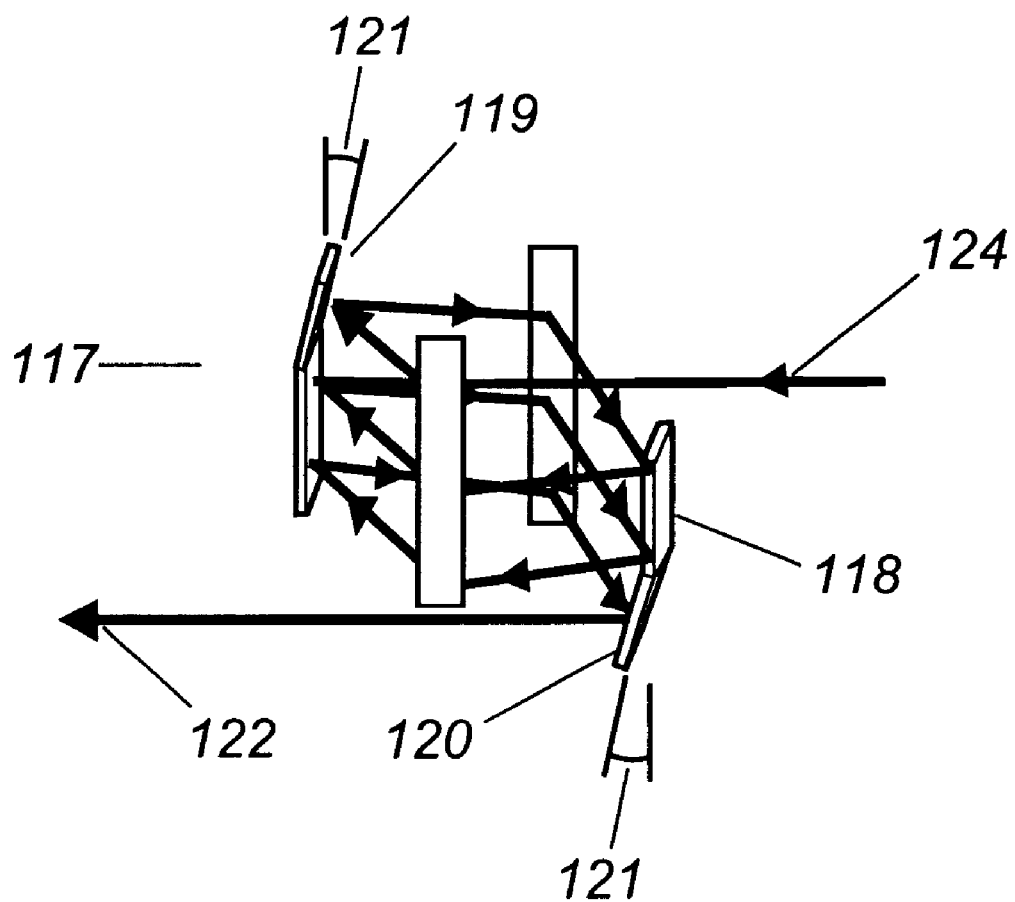

Referring to FIG. 8, for a sixth embodiment of the invention, the second and fourth mirrors 117, 118 are both tilt mirrors 117, 118 with the tilt portions 119, 120 configured at an angle 121 to provide egress to the delayed signal 122 to exit the compact delay stage 123 at the same angle as the light signal 124 entered the compact delay stage 123.

Figure 9:
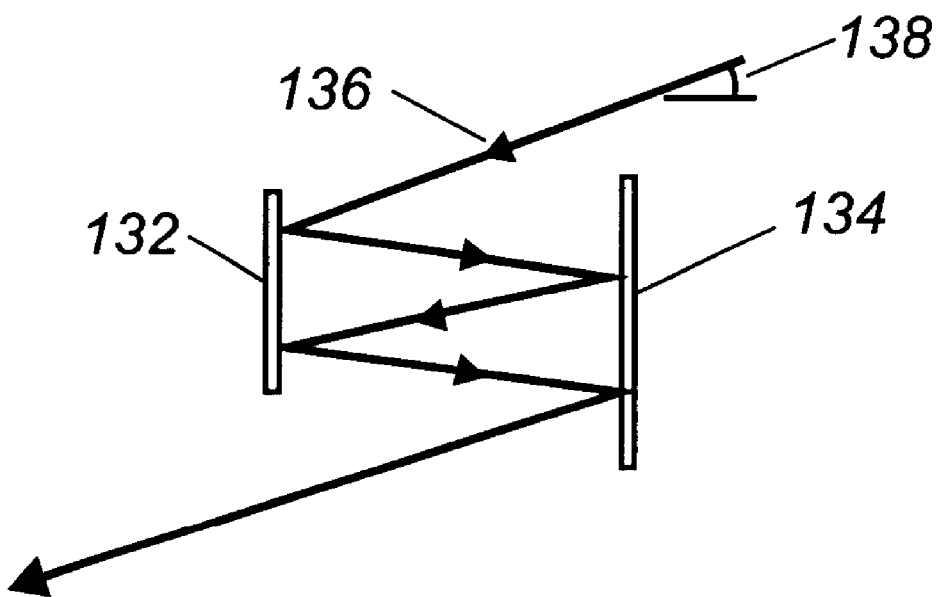

Referring to FIG. 9, for a seventh embodiment of the invention, the compact delay stage 130 is comprised of two mirrors 132 & 134. The light signal 136 enters the compact delay stage 130 at an inclined angle 138 and is incident on the first mirror 132 at that inclined angle 138. The first mirror 132 redirects the light signal 136 towards the second mirror 134 at the inclined angle 138 which in turn redirects the signal 136 back towards the first mirror 132 at the inclined angle 138. This reflecting and redirecting of the light signal 136 between the first 132 and second 134 mirrors continues until the light signal 136 has been delayed the desired amount.

Figure 10:
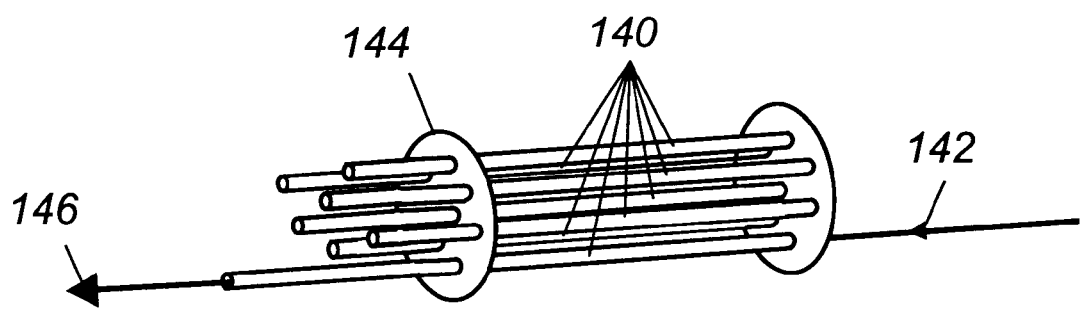

Referring to FIG. 10, the present invention is not limited to a compact delay stage having a plurality of mirrors but can be practiced with refractive elements 140 as well. For an eighth embodiment of the invention, a plurality of refractive elements 140 are configured to provide a fixed predetermined amount of phase delay to the light signal 142 by selectively directing the light signal 142 through a selected refractive element 140. The refractive elements 140 can be germanium, sapphire, or any transmissive material with the dielectric constant and the length of each refractive element 140 determining the amount the light signal 142 is delayed. As shown, the refractive elements 140 can be formed of the same material each element 140 having a different length. Alternatively, the refractive elements 140 can be formed of different materials each having a different index of refraction and dielectric constant. Preferably, the refractive elements 140 are located on a mechanism, such as a wheel 144 which is configured to move the selected refractive element 140 into the path of the light signal 142. The light signal 142 propagates through the selected refractive element 142 delaying the light signal 142 to provide a delayed light signal 146.

Figure 11:
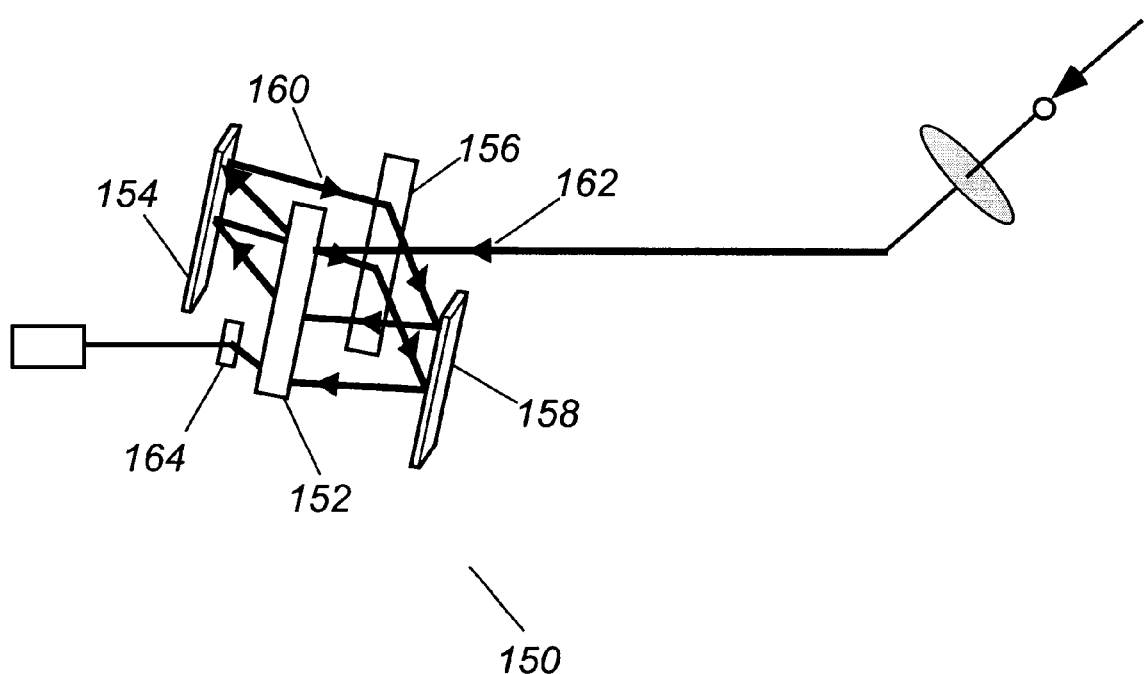
FIG. 11 is a schematic diagram of an interferometer having a compact delay structure in accordance with a ninth embodiment of the invention.

Referring to FIG. 11, for a ninth embodiment of the invention, a compact delay stage and a three stage delay line are coupled together into a single compact delay structure 150. The compact delay structure 150 is comprised of a plurality of mirrors 152–158 configured to provide a selectable phase delay path 160 to the light signal 162. A flip mirror 164 is provided which is positioned at a predetermined location and configured to intercept the signal 162 at a predetermined point. In this manner, a single structure 150 can provide increased path delay in the centimeter/millimeter range in addition to phase delay in the centimeter and above range.

Figure 12:
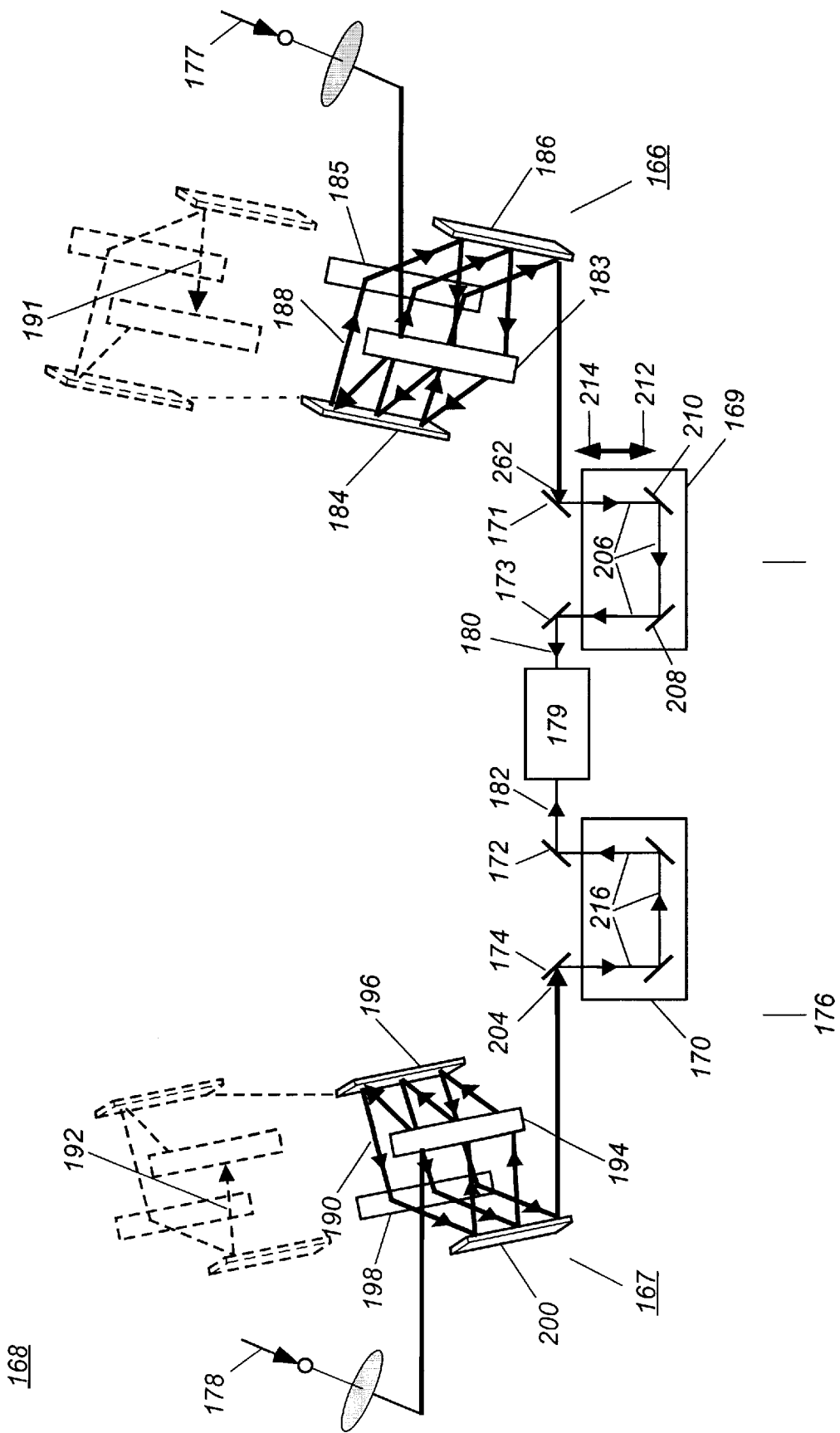
FIG. 12 is a schematic diagram of a high precision interferometer having two compact delay stages in accordance with a tenth embodiment of the invention; and, FIG. 13 is a schematic diagram of an interferometer having compact delay structures in each leg of the interferometer in accordance with an eleventh embodiment of the invention.

Referring to FIG. 12, for the preferred embodiment of the invention, two separate compact delay stages 166, 167 are disposed in a high precision interferometer 168 and are coupled with first 169 and second 170 delay lines, first 171 and second 172 input mirrors, and, first 173 and second 174 output mirrors respectively to provide first 175 and second 176 compact delay lines which will provide a larger amount of phase delay to the first light signal 177 than to the second light signal 178 and additionally provide the same number of reflections at the same relative angles to the first 177 and second 178 light signals respectively.

For a high precision interferometer 168, it is not only important that the path length between the first 177 and second 178 light signals be equalized prior to combining in the combiner 179; but, it is also important that those light signals 177, 178 have the same relative polarization prior to being combined. Since the polarization of a light signal is affected by the number of reflections a light signal undergoes and the angle of those reflections, for a high precision interferometer 168 both the first 177 and second 178 light signals must be reflected the same number of times and at the same relative angles with respect to each other so that the first 180 and second 182 final delayed signals will have the same relative polarization prior to being combined in the combiner 179. To do so, the compact delay stages 166, 167 and the three stage delay lines 169, 170 are configured to reflect the first 177 and second 178 light signals the same number of times and at the same relative angles with respect to one another so that the first 180 and second 182 final delayed signals will have the same relative polarization prior to combining in the beam combiner 179.

To match the phases of the first 177 and second 178 light signals, the first light signal 177 must be phase delayed more than the second light signal 178. To do so, the mirrors 183–186 of the first compact delay stage 166 are configured to provide a larger delay path 188 than the delay path 190 provided by the second compact delay stage 167. The first compact delay stage 166 is configured so that one loop 191 between the mirrors 183–186 of the first compact delay stage 166 is longer than one loop 192 between the mirrors 194–200 of the second compact delay stage 167. This difference in the length of the loops 191, 192 delays the first light signal 177 a greater amount than the second light signal 178 while at the same time reflecting the first 177 and second 178 light signals the same number of times and at the same relative angles.

Phase delaying the first 177 and second 178 light signals over the first 188 and second 190 delay paths translates the first 177 and second 178 light signals into first 202 and second 204 intermediate delayed signals. Typically, the first intermediate delayed signal 202 must be phase delayed an additional amount with respect to the second intermediate delayed signal 204 to exactly match the phases of the final delayed signals 180, 182. To provide this additional phase delay, the first intermediate delayed signal 202 is directed into the first delay line 169 which provides an adjustable delay path 206 to further phase delay the first intermediate delayed signal 202 a desired additional amount. To increase or decrease the delay path 206, mirrors 208, 210 are moved in the direction indicated by arrows 212 and 214 respectively. Voice coils (not shown) and piezoelectric materials (not shown) can be added to the first delay line 170 so that the first delay line 169 is a three stage delay line 169 to provide finer phase delay adjustments if desired.

Directing the first intermediate delayed signal 202 over the first delay path 206 translates the first intermediate delayed signal 202 into a first final delayed signal 180. The first intermediate delayed signal 202 incurred four reflections to become the first final delayed signal 180; therefore, the second intermediate delayed signal 204 should also incur four reflections to provide first 180 and second 182 final delayed signals which have the same relative polarization. To accomplish this, the second delayed signal 204 is directed into the second delay line 170 which is configured to provide a delay path 216 which reflects the second intermediate delayed signal 204 the same number of times and at the same relative angles as the first intermediate delayed signal 202 is reflected by the first delay line 169. The second delay line 170 can be configured to be a fixed length delay line 170 providing a fixed length delay path 204. The fixed length delay path 204 can be configured to provide a relatively small delay path 204 so that the delay path 196 provided by the second three stage delay line 170 can be adjusted to phase delay the second intermediate delayed signal 204 more than the first intermediate delayed signal 204 to match the phases of the first 180 and second 182 final delayed signals.

Figure 13:
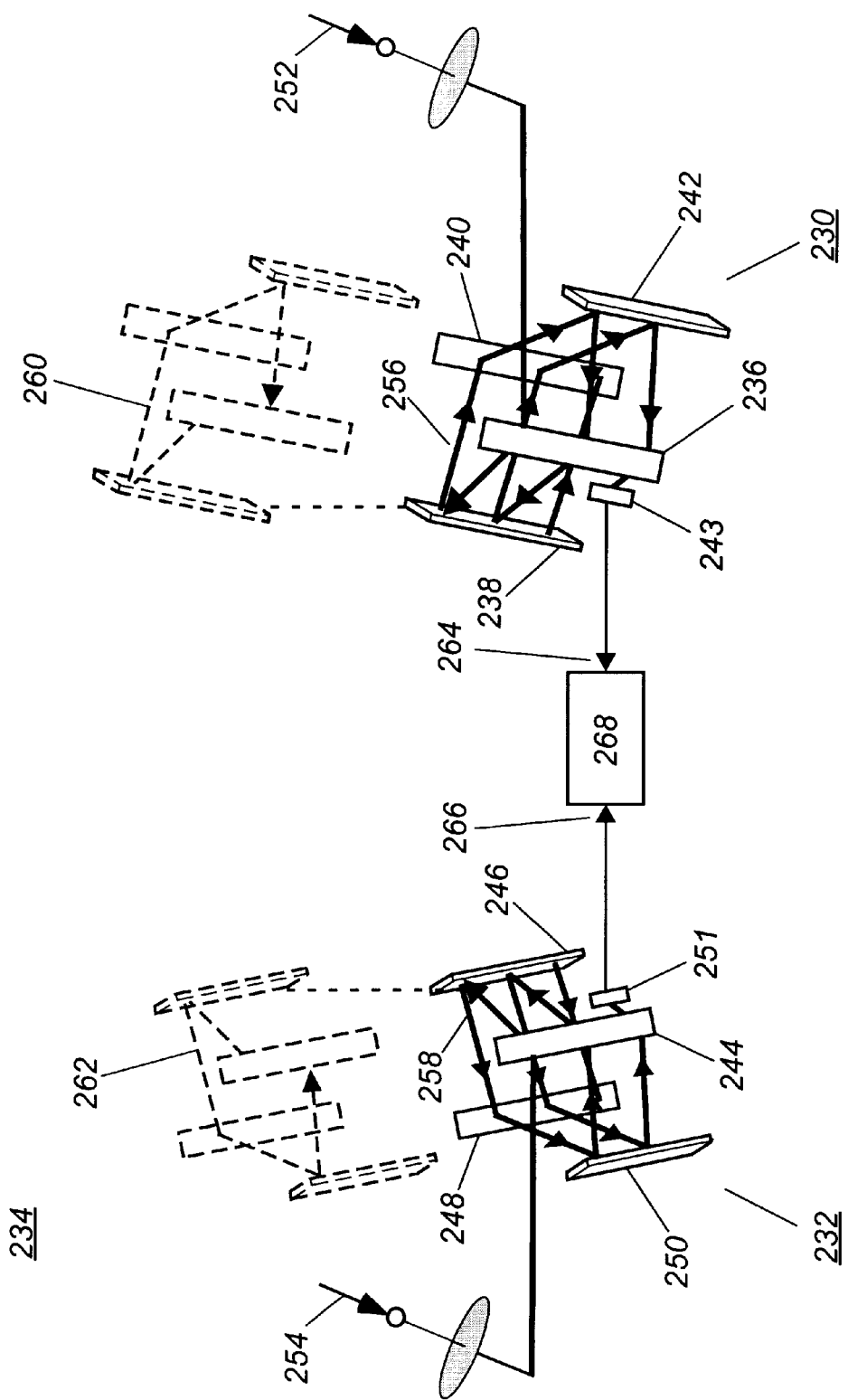

Referring to FIG. 13, for a ninth embodiment of the invention, two compact delay structures 230, 232 are disposed in a high precision interferometer 234. The mirrors 236–243 of the first compact delay structure 230 and the mirrors, 244–251 of the second compact delay structure 232 are configured to provide the same number of reflections at the same angles for both the first 252 and second 254 light signals with respect to each other. To equalize the path lengths between the first 252 and second 254 light signals, the first compact delay structure 230 is configured to provide a larger delay path 256 than the delay path 258 provided by the second compact delay structure 232 by providing a larger delay loop 260 than the delay loop 262 provided by the second compact delay structure 232. In this manner, the first light signal 252 is delayed a desired amount with respect to the second light signal 254 and the polarization of the first 264 and second 266 delayed signals are matched such that proper combining of the delayed signals 264, 266 can be conducted in the combiner 268.

By adding a compact delay stage to the typical interferometer or coupling a compact delay stage with a three stage delay line to form a compact delay structure, the present invention provides the capability to provide increased amounts of phase delay to a light signal. In this manner, the present invention can provide virtually unlimited, selectable amounts of phase delay to a light signal. By disposing two compact delay stages in an interferometer, or, disposing two compact delay structures in an interferometer, the present invention can provide additional amounts of phase delay to a light signal while matching the polarization of the final delayed signals. It will be appreciated by persons skilled in the art that the present invention is not limited to what has been shown and described hereinabove, nor the physical implementations described immediately above. The scope of the invention is limited solely by the claims which follow.

What is claimed is:

1. A compact delay stage for phase delaying an input light signal comprising:

a plurality of reflective structures configured to provide a delay path to said input light signal, one said reflective structure configured to accept said input light signal and direct said input light signal between said reflective structures a variable selectable number of times until said input light signal has completed said delay path thereby translating said input light signal into a delayed signal; and, one said reflective structure configured to provide egress to said delayed signal to exit said compact delay stage.

2. A compact delay stage as in claim 1, wherein said one reflective structure configured to provide egress to said light signal is a flip mirror.

3. A compact delay stage as in claim 1, wherein said plurality of reflective structures are a plurality of mirrors.

4. A delay line as in claim 1, wherein said plurality of reflective structures comprise first and second mirrors, said light signal incident on said first mirror, said first mirror reflecting said light signal and redirecting said light signal towards said second mirror, said second mirror reflecting said light signal and redirecting said light signal back towards said first mirror, said reflecting and redirecting of said light signal continuing for said predetermined selectable number of times.

5. A compact delay stage as in claim 4, wherein said mirrors are planar mirrors configured such that said input light signal is incident on said first mirror at an angle and reflected from each said mirror at said angle.

6. A compact delay stage as in claim 5, wherein one said mirror is a flip mirror.

7. A compact delay stage as in claim 1, wherein said plurality of reflective structures are at least three mirrors configured to direct said input light signal in a spiral pattern.

8. A compact delay stage as in claim 7, wherein said mirrors are planar mirrors configured such that said input light signal is incident on each said mirror at an angle and reflected from each said mirror at said angle.

9. A compact delay stage as in claim 7, wherein one said mirror is configured to direct said input light signal at a different angle than said other mirrors.

10. A compact delay stage as in claim 9, wherein said mirrors are planar mirrors with one said mirror being positioned at an angle with respect to the other mirrors to direct said input light signal at a different angle than said other mirrors.

11. A compact delay stage as in claim 9, wherein said mirrors are planar mirrors with two said mirrors being positioned at an angle with respect to the other mirrors, one of said two mirrors directing said input light signal at a first angle and the other of said two mirrors directing said input light signal at a second angle which is equal and opposite to said first angle.

12. An interferometer comprising:

first and second collectors configured to collect first and second light signals respectively;

a first compact delay stage for phase delaying said first light signal comprising:

a plurality of first reflective structures configured to provide a first delay path to said first light signal, one of said first reflective structure configured to accept said first light signal and direct said first light signal between said first reflective structures a first variable selectable number of times until said first light signal has completed said first delay path thereby translating said first light signal into a first intermediate delayed signal, one of said first reflective structure configured to provide egress to said first intermediate delayed signal to exit said first compact delay stage;

a first delay line configured to provide a second delay path to said first intermediate delayed signal to translate said first intermediate delayed signal into a first final delayed signal; and, a beam combiner configured to combine said first final delayed signal and said second light signal.

13. An interferometer as in claim 12, wherein one of said first reflective structures is a first flip mirror.

14. An interferometer as in claim 12, wherein said first delay line is a first adjustable length delay line.

15. An interferometer as in claim 14, wherein said first adjustable length delay line comprises a plurality of second reflective structures, two of which are located in fixed positions and one of which is moveable, said first adjustable length delay line providing at most a preselected maximum amount of phase delay to said first delayed signal.

16. An interferometer as in claim 15, wherein said first compact delay stage and said first adjustable length delay line are configured so that directing said first light signal between said first reflective structures one time provides approximately the same amount of maximum phase delay as provided by said adjustable length delay line.

17. An interferometer as in claim 12, further comprising a second compact delay stage for phase delaying said second light signal comprising:

a plurality of second reflective structures configured to provide a third delay path to said second light signal, one of said second reflective structures configured to accept said second light signal and direct said second light signal between said second reflective structures a second variable selectable number of times until said second light signal has completed said third delay path thereby translating said second light signal into a second intermediate delayed signal, one of said second reflective structure configured to provide egress to said second delayed signal to exit said second compact delay stage; and, a second delay line configured to provide a fourth delay path to said second intermediate delayed signal to translate said second intermediate delayed signal into a second final delayed signal, said beam combiner configured to combine said first and second final delayed signals.

18. An interferometer as in claim 17, wherein one of said first reflective structures is a first flip mirror and one of said second reflective structures is a second flip mirror.

19. An interferometer as in claim 17, wherein said first and second reflective structures are equal in number and configured to reflect said first and second light signals the same number of times and at the same relative angles with respect to each other.

20. An interferometer as in claim 19, wherein said first and second compact delay stages are configured so that directing said first light signal between said first reflective structures one time provides a larger preselected amount of phase delay to said first light signal than the phase delay provided to the second light signal by directing said second light signal between said second reflective structures one time.

21. An interferometer as in claim 20, wherein said first delay line is comprised of a plurality of third reflective structures and said second delay line is comprised of a plurality of fourth reflective structures.

22. An interferometer as in claim 21, wherein said third and fourth reflective structures are equal in number and configured to reflect said first intermediate delayed signal the same number of times and at the same relative angles as said second intermediate delayed signal.

23. An interferometer as in claim 22, wherein said first delay line is an adjustable length delay line and said second delay line is a fixed length delay line.

24. An interferometer as in claim 22, wherein said first delay line is configured so that said third delay path is longer than said fourth delay path by a preselected amount which is selected so that said first and second final delayed signals will have the same relative phase.

25. An interferometer as in claim 24, wherein said first delay line is an adjustable length delay line and said second delay line is a fixed length delay line.

26. An interferometer as in claim 25, wherein said adjustable length delay line is an adjustable three stage delay line.

27. An interferometer comprising:

first and second collectors configured to collect first and second light signals respectively;

a first compact delay structure for phase delaying said first light signal comprising:

a plurality of first reflective structures configured to provide a first delay path to said first light signal, one of said first reflective structures configured to accept said first light signal and direct said first light signal between said first reflective structures a variable selectable number of times, one of said first reflective structures positional to intercept said first light signal at a first predetermined point when said first light has been phase delayed a first predetermined amount and translated into a first delayed signal, and provide egress to said first delayed signal;

a second compact delay structure for phase delaying said second light signal comprising:

a plurality of second reflective structures configured to provide a delay path to said second light signal, one of said second reflective structures configured to accept said second light signal and direct said second light signal between said second reflective structures a predetermined selectable number of times, one of said second reflective structures positional to intercept said second light signal at a second predetermined point when said second light has been phase delayed a second predetermined amount and translated into a second delayed signal, and provide egress to said second delayed signal; and, a beam combiner configured to combine said first and second delayed signals.

28. An interferometer as in claim 27, wherein said first and second reflective structures are equal in number and configured to reflect said first light signal the same number of times and at the same relative angles as said second light signal.

29. An interferometer as in claim 28, wherein said first and second reflective structures are configured to provide a greater amount of phase delay to said first light signal than said second light signal by a preselected amount.

* * * * *